United States Patent [19]

Ahmed

[11] 4,204,133
[45] May 20, 1980

[54] TEMPERATURE-SENSITIVE CONTROL CIRCUITS

[75] Inventor: Adel A. A. Ahmed, Annandale, N.J.

[73] Assignee: RCA Corporation, New York, N.Y.

[21] Appl. No.: 842,078

[22] Filed: Oct. 14, 1977

[51] Int. Cl.² .................. H03K 1/00; H03K 17/00
[52] U.S. Cl. .................. 307/310; 307/296 R; 330/256
[58] Field of Search ............... 307/296, 310; 330/256, 330/266, 272, 288, 280; 323/4

[56] References Cited

U.S. PATENT DOCUMENTS

| 3,393,870 | 5/1968 | Jeffrey | 307/310 |
|---|---|---|---|
| 3,651,346 | 3/1972 | Limberg | 330/88 |
| 3,760,200 | 9/1973 | Taniguchi et al. | 307/310 |
| 4,042,886 | 8/1977 | Hanna | 330/256 |

Primary Examiner—Stanley D. Miller, Jr.
Assistant Examiner—B. P. Davis
Attorney, Agent, or Firm—Eugene M. Whitacre; Paul J. Rasmussen; Allen LeRoy Limberg

[57] ABSTRACT

The emitter-to-base potential of a first transistor operated at predetermined current level is scaled up and applied as the emitter-to-base potential of a second transistor. The resulting collector current of the second transistor decreases with increasing temperature and is differentially compared against a current of opposing polarity to obtain an output current which changes polarity at a given temperature.

7 Claims, 6 Drawing Figures

TEMPERATURE-SENSITIVE CONTROL CIRCUITS

The present invention relates to temperature-sensitive control circuits which rely upon the change with temperature in the operating characteristics of semiconductor devices included in their construction, which conventionally is in monolithic integrated circuit form.

Vittoz in U.S. Pat. No. 3,809,929 issued May 7, 1974 and entitled "Temperature Sensing Device" describes a temperature-sensitive control circuit in which the emitter-to-base potential of a first transistor arranged to operate at a predetermined collector current level is divided and applied to a second transistor, their resultant collector currents then being differentially compared using a current mirror amplifier, to develop an output current which changes polarity at a prescribed temperature. The present inventor, Ahmed, in U.S. Pat. No. 3,825,778 issued July 23, 1974 and entitled "Temperature-Sensitive Control Circuit" describes a temperature-sensitive control circuit in which the offset potential across a first series connection, of a number n of forward-biased diodes, arranged to operate at predetermined current level, is applied to a second series connection, of a transistor base-emitter junction and n further forward-biased diodes, with the collector current of the transistor being differentially compared with a current equal to or proportional to the current flowing through the first series connection. This comparison is carried out using a current mirror amplifier for the purpose of developing an output current which changes polarity at a prescribed temperature. Also of interest with regard to the present invention is Crowle's U.S. Pat. No. 4,021,722 issued May 3, 1977 and entitled "Temperature Sensitive Current Divider" in which a fraction of the emitter-to-base potential of a reference transistor is applied between the base electrodes of two transistors in long-tailed pair configuration, the collector currents of the long-tailed pair transistors being differentially compared using a current mirror amplifier, to develop an output current which changes polarity at a prescribed temperature.

The aforementioned prior art temperature-sensitive control circuits each have the problem that a transistor providing collector current as one of the collector currents to be compared operates with a comparatively miniscule collector current, requiring the current mirror amplifier used in making comparison to have a current gain that is a small fraction or a large multiple of minus unity. Such a current mirror amplifier tends to take up excessive die area in a monolithic integrated circuit construction. But also the incremental change with temperature of the miniscule collector current is smaller than one would like and consequently, the control circuit has to operate into a rather high impedance load to maintain high sensitivity to temperature change.

In a temperature-sensitive control circuit embodying the present invention, the foregoing problems are surmounted. The emitter-to-base potential of a first transistor arranged to operate at a predetermined collector current level is scaled up and applied to a second transistor, having its collector electrode connected to an output terminal for the temperature-sensitive control circuit. The scaled up emitter-to-base potential of the first transistor when applied as emitter-to-base potential to the second transistor conditions the second transistor for substantial collector current which has desirably increased incremental change with temperature.

In the drawing:

FIG. 1 shows, on a linear voltage versus linear temperature plot (not necessarily to scale) loci 1, 2, 3, 4, 5 of the emitter-to-base voltages, or $V_{BE}$'s, of transistors operated with respectively increasing values of $I_C/K$. These loci are defined by the following equation defining transistor action.

Figure 1:
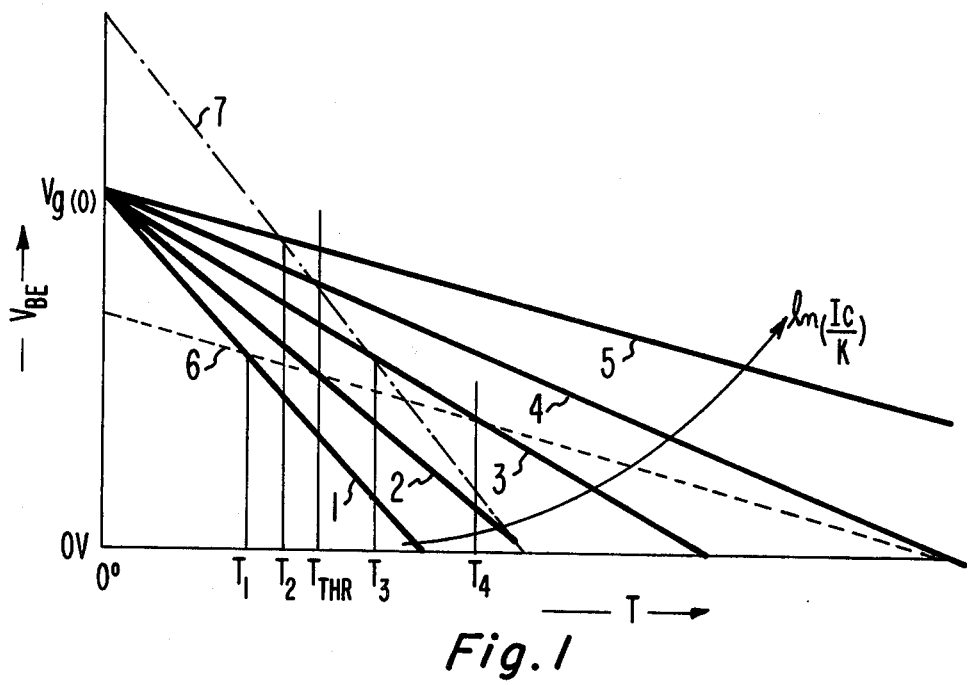
FIG. 1 is a plot of transistor characteristics versus temperature used for illustrating the differences in operation of the present invention and of prior art configurations of the sort described by Vittoz.

$$I_C = KT^r \exp[(-q/kT)(V_{g(0)} - V_{BE})] \quad (1)$$

wherein
  $I_C$ is transistor collector current,
  K is a temperature-independent constant depending on geometrical factors and fixed physical constants,
  T is absolute temperature,
  r is determined by the temperature dependence of the diffusion constant of minority carriers in the base region of the transistor (equalling 1.5 for NPN silicon transistor and 1.3 for PNP silicon transistors),
  q is the charge on an electron,
  k is Boltzmann's constant,
  $V_{g(0)}$ is the extrapolated bandgap voltage at T=0 (which equals 1.205 V for silicon), and
  $V_{BE}$ is transistor emitter-to-base voltage.

Equation 1 is written in terms of $V_{BE}$ per equation 2 and then differentiated per equation 3 to develop expressions describing the slopes of the loci 1, 2, 3, 4, 5.

$$V_{BE} = V_{g(0)} + (kT/q)(\ln I_C - \ln K - r \ln T) \quad (2)$$

$$\partial V_{BE}/\partial T = (k/q)(\ln I_C - \ln K - r - r \ln T) \quad (3)$$

In Vittoz's temperature-sensitive control circuit, alluded to above, the $V_{BE}$ of a first transistor conditioned by direct-coupled collector-to-base feedback to operate with a constant $I_C$ may be assumed to be defined by locus 4 and is proportionately divided to develop a potential defined by locus 6, shown in dashed line, which divided potential is then applied as the $V_{BE}$ of a second transistor. As the temperature T of the first and second transistors increases to $T_1$, $T_{THR}$ and $T_4$, successively, the $I_C$ of the second transistor successively takes on the values associated with its crossings of loci 1, 2 and 3. The $I_C$ of the second transistor is differentially compared against the level of current that defines locus 2 to provide a control current that changes polarity at the threshold temperature $T_{THR}$. The magnitude of the control current is delimited by the relatively small $I_C/K$ value defined by locus 2 and so tends to be small itself. Further, the percentage change in the amplitude of this control current as compared to the collector current of the second transistor tends to be small since the slopes of loci 2 and 6 are not very steep. In the Vittoz circuit, then, the first transistor has to be designed to operate with an $I_C$ that is fairly large, so that the amplifier K of the second transistor falls into the range where adequate values of control current can be obtained with transistors that are sufficiently small in area to be practically integrated.

The present inventor has overcome these problems by operating his first transistor at a constant $I_C$ as defined by locus 2, tending to be lower in the practical range for integrated transistor operation, then proportionately scaling up the $V_{BE}$ of the first transistor and applying the scaled up potential as the $V_{BE}$ of his second transistor. This scaled up potential is shown as the alternately dashed-and-dotted locus 7. As the temperature T of the transistors increases the $I_C$ of the second transistor of the present inventor's circuit successively takes on the values associated with its crossings of loci 5, 4 and 3 at $T_2$, $T_{THR}$ and $T_3$, respectively. Differentially comparing the $I_C$ of this second transistor with the level of current that defines locus 4 provides a control current that changes polarity at the threshold temperature $T_{THR}$.

The magnitude of this control current is delimited by the comparatively large $I_C/K$ value defined by locus 4. Further, the slopes of loci 4 and 7 are relatively steep compared to those of loci 2 and 6. So the percentage change in the amplitude of this current as compared to the collector current of the second transistor is comparatively large in circuitry embodying the present invention.

In temperature-sensitive control circuitry embodying the present invention, conduction in the second transistor is reduced with increasing temperature, in contrast to the Vittoz circuit. This is of practical significance in schemes for controlling the temperature of the integrated circuit on which the temperature-sensitive control circuitry is located; since it avoids the possibility of regenerative cycling due to the positive thermal feedback caused by self-heating of the second transistor.

Figure 2:
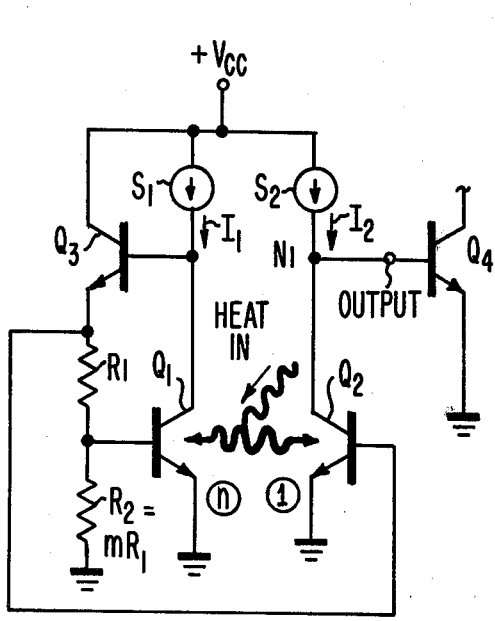
FIGS. 2 and 3 are schematic diagrams of temperature-sensitive control circuits embodying the present invention and relying on current comparison of the collector current of the second transistor and a fixed source of current to provide control current to a subsequent transistor.

In FIG. 2, first and second transistors Q1 and Q2, shown with grounded emitter electrodes, are thermally coupled to each other and to receive heat from their environment, which thermal couplings are symbolized by the double-headed wavy arrow. Transistors Q1 and Q2 would have respective collector currents related in n-to-one ratio for like emitter-to-base voltages, as symbolized by the encircled "n" and "1" near their respective emitter electrodes. Q1 is conditioned by direct-coupled collector-to-base feedback to conduct substantially all of the current I1 supplied to its collector electrode by constant current generator S1. The feedback connection includes transistor Q3 in emitter follower connection having the collector electrode of Q1 connected to its base electrode and having its collector electrode connected to a supply of operating potential, $+V_{CC}$, conditioning Q1 for normal transistor operation. The feedback connection further includes a resistive potential divider comprising resistors R1 and R2 having values also denominated R1 and R2, which divides the emitter potential of Q3 to develop a base potential for Q1 which is $m/(m+1)$ times as large. The direct-coupled collector-to-base feedback connection of Q1 adjusts its emitter-to-base potential $V_{BEQ1}$ to the value associated with a collector current substantially equal to $I_1$.

To obtain the value of $V_{BEQ1}$ associated with the collector current $I_{CQ1}$ of Q1 being substantially equal to $I_1$, from the resistive potential divider comprising R1 and R2, the emitter potential of Q3 which is divided should have a value $(m+1)/m$ times $V_{BEQ1}$. This $(m+1)V_{BEQ1}/m$ potential is applied to Q2 as its emitter-to-base potential $V_{BEQ2}$.

In FIG. 2, a constant current generator S2 supplies a current $I_2$ to a node N1, which the collector current of Q2 is withdrawn from and which connects to an output terminal labelled "OUTPUT". $I_2$ is chosen so that at temperatures higher than a prescribed threshold temperature $T_{THR}$ it exceeds the collector current of Q2, providing for current flow from S2 via the OUTPUT terminal to subsequent circuitry. (The value n, determined in most cases by the ratio of the effective area of the base-emitter junction of Q1 to that of the base-emitter junction of Q2 where vertical-structure NPN transistors are concerned, is preferably chosen to be more than 1 to minimize the ratio of the collector currents of Q1 and Q2.) The circuitry subsequent to the OUTPUT terminal may, for example, as shown, be a transistor Q4 of similar conductivity type to Q1 and Q2. Q4 is arranged in common-emitter amplifier configuration with its base electrode connected from the OUTPUT terminal of the temperature-sensitive control circuit and is biased into conduction by $I_2$ supplied from constant current generator S2 exceeding the collector current demand of Q2. At temperatures below $T_{THR}$ the collector current demand of Q2 will exceed $I_2$, leaving no base current for Q4 and so biasing Q4 for non-conduction, and Q2 will become saturated unless forestalled from doing so.

Saturation of Q2 is an advantage in certain applications, since its current demand need not be satisfied by current drawn from the supply until the threshold condition is reached. At such time, it will be brought out of saturation, thus rendering the effects of shared emitter to base voltages of Q1 and Q2 more predictable and amenable to exact calculations for the area of operation which is of primary interest. (Saturation of Q2, while not detrimental to the performance of the circuit of FIG. 2, may, as well known, be forestalled by a clipper circuit, if desired. A representative clipper circuit comprises a semiconductor junction having its cathode connected to N1 and its anode connected to a potential about $3V_{AC}/2$ more positive than reference ground, where $V_{AC}$ is the cathode-to-anode voltage of a forward-biased semiconductor junction.)

Figure 3:
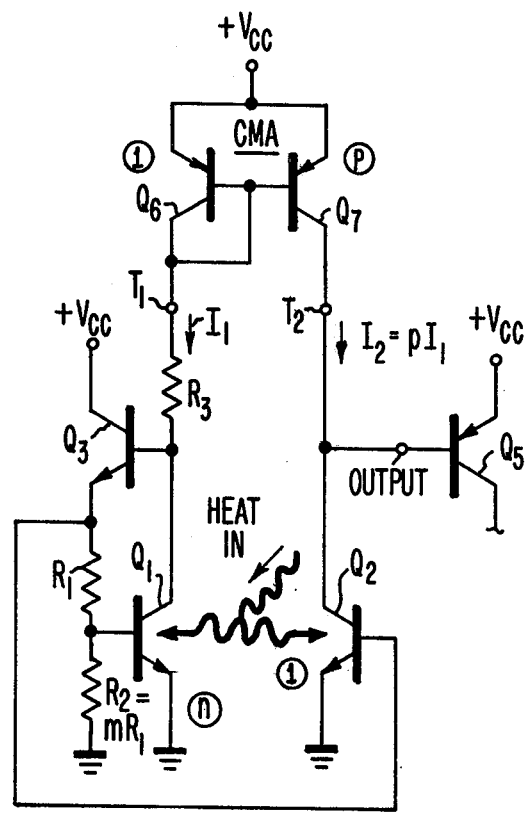

FIG. 3 shows a representative way in which one may supply the currents $I_1$ and $I_2$. Current mirror amplifier CMA includes transistors $Q_6$ and $Q_7$ and has a current gain of $-p$ as between its input terminal $T_1$ and its output terminal $T_2$. CMA is a current mirror amplifier of the type having an input circuit between its common terminal connected to $V_{CC}$ and its input terminal $T_1$ which input circuit maintains a substantially constant offset potential across itself over a range of input currents. In the particular type of CMA shown this offset potential is the emitter-to-base offset potential $V_{BEQ6}$ of the self-biased transistor $Q_6$ connected across the emitter base junction of transistor $Q_7$ having base, emitter and collector electrodes connected to the input, common and output terminals, respectively of the CMA.

The collector-to-base feedback connection of $Q_1$ keeps the emitter of $Q_3$ at $(m+1)V_{BEQ1}/m$ potential and the feedback connection also keeps the base of $Q_3$ more positive than its emitter by the emitter-to-base offset $V_{BEQ3}$ of $Q_3$.

Resistor $R_3$ has a voltage across it equal to $$\{+V_{CC}-V_{BEQ6}-V_{BEQ3}-[(m+1)V_{BEQ1}/m]\}, \quad (4)$$

and the current $I_1$ through resistor $R_3$ can be straightforwardly calculated by Ohm's Law. $I_2$ will be p times as large as $I_1$ owing to CMA having a current gain of $-p$. In the simple current mirror amplifier configuration, CMA, shown in FIG. 2 this current gain comes about because of the collector current versus emitter-to base characteristics of $Q_7$ and $Q_6$ being in p-to-one ratio. This ratio is achieved in monolithic construction using reverse-biased junctions for isolation of elements by scaling the collector areas of $Q_7$ and $Q_6$ in p-to-one ratio to affect their relative collection efficiencies, since $Q_7$ and $Q_6$ being of PNP conductivity type are conventionally constructed using lateral structures.

FIG. 3 also shows the reversal in current from the OUTPUT terminal being sensed by a PNP transistor $Q_5$ rather than an NPN transistor $Q_4$. This is advantageous to do in certain applications, since the base-emitter junction of $Q_5$ when forward-biased clamps the OUTPUT terminal to within a junction offset voltage of $+V_{CC}$ forestalling saturation of $Q_2$ so the effects of shared emitter-to-base potential of $Q_1$ and $Q_2$ can be more confidently predicted. The saturation of $Q_7$ when the collector current of $Q_2$ is less than p times the collector current of $Q_1$ presents no significant operating problem. This arrangement is convenient also when the ensuing stage (including $Q_5$) must handle appreciable currents and so contributes substantially to self heating of the integrated circuit, since the thermal coupling is of a sense that avoids thermal cycling problems. $Q_5$ may be in many practical circuits be replaced by a Darlington cascade connection of transistors.

Figure 4:
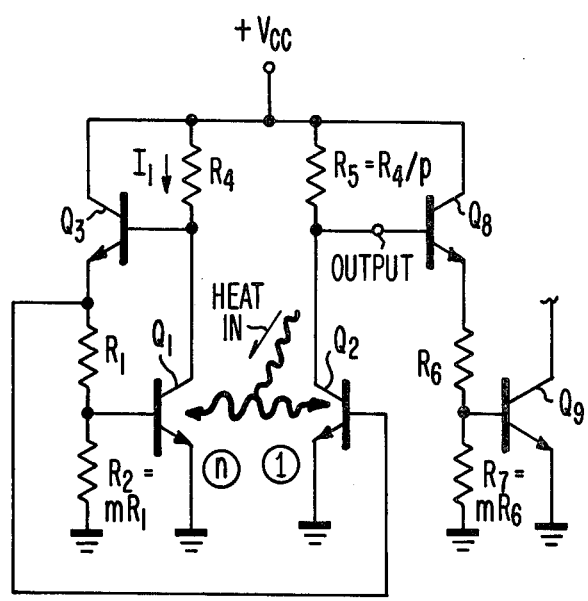
FIGS. 4 and 5 are schematic diagrams of temperature-sensitive control circuits embodying the present invention and relying on voltage comparison to provide control current to subsequent circuitry.

FIG. 4 shows how the FIG. 2 configuration may be modified to use voltage-sensing techniques for determining when the collector current of $Q_2$ is larger than that of $Q_1$ by a given factor. $R_4$ is connected between $+V_{CC}$ and the base electrode of $Q_3$, which electrode is at $\{V_{BEQ3}+[(m+1)V_{BEQ1}/m]\}$ potential. The current $I_1$ through $R_4$ can be calculated by Ohm's Law dividing the $\{+V_{CC}-V_{BEQ3}-[(m+1)V_{BEQ1}/m]\}$ potential across $R_4$ by the resistance of $R_4$. A resistor $R_5$ having a resistance smaller than that of $R_4$ by a factor p connects the collector electrode of $Q_2$ to $+V_{CC}$; and, when the collector current of $Q_2$ is more than p times larger than the collector current of $Q_1$, the potential drop across $R_5$ will exceed that across $R_4$.

The potential appearing at the OUTPUT terminal is applied to the base electrode of an emitter-follower transistor $Q_8$, being decremented by a junction offset potential $V_{BEQ8}$ that compensates for the $V_{BEQ3}$ decrement in potential between the base and emitter electrodes of $Q_3$. The decremented OUTPUT potential is then divided by m in a resistive potential divider comprising $R_6$ and $R_7$ to supply emitter-to-base potential $V_{BEQ9}$ to $Q_9$. At temperatures higher than $T_{THR}$, when the potential drop across $R_5$ is less than that across $R_4$, $Q_9$ is biased into conduction to demand collector current. At temperatures lower than $T_{THR}$, $Q_9$ is not conductive and does not demand collector current.

Figure 5:
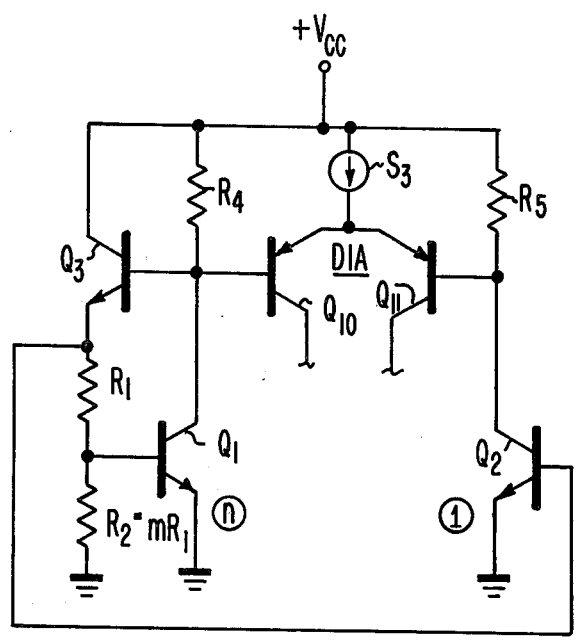

Alternatively, as shown in FIG. 5, the relative magnitudes of the potential drop across $R_4$ and $R_5$ may be compared using a differential-input amplifier DIA. DIA is shown as comprising PNP transistors $Q_{10}$ and $Q_{11}$ connected in long-tailed pair configuration with constant current generator $S_3$ supplying current to the interconnection of their emitter electrodes.

Figure 6:
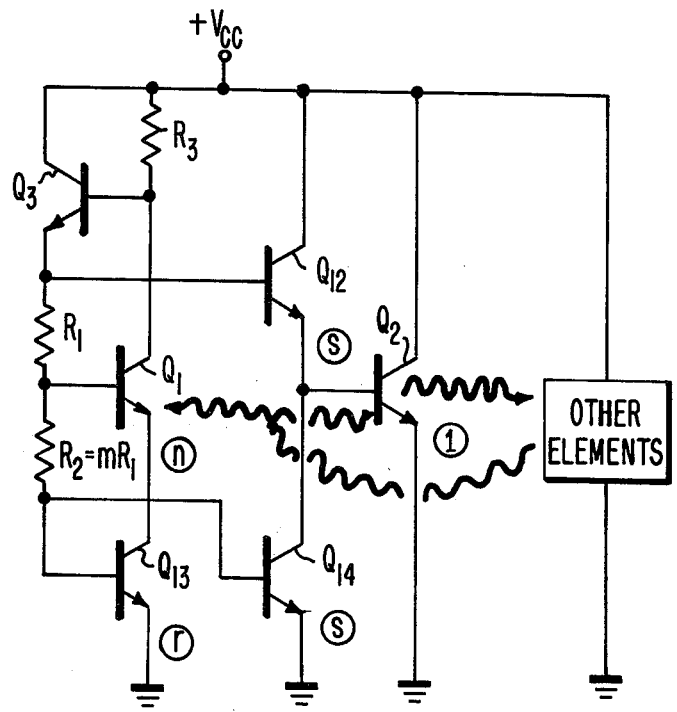
FIG. 6 is a schematic diagram of a temperature-sensitive control circuit embodying the present invention and providing for stabilization of circuit temperature.

In FIG. 6 the elements are presumed all to be disposed with the same monolithic integrated circuit structure and to respond to the temperature of other elements which are disposed within the monolithic integrated circuit structure for supplying an adjustable amount of heat to lessen variations in the temperature of those other elements. The emitter-to-collector path of $Q_2$ is connected across the $+V_{CC}$ supply for providing the principal means for supplying heat to the other elements. This is symbolized in FIG. 6 by the wavy arrows demonstrating the thermal coupling of $Q_2$ to these other elements.

In FIG. 6 an emitter-follower transistor $Q_{12}$ buffers the emitter electrode of $Q_3$ from the rather large base current demands that may be expected of $Q_2$. The emitter-to-base offset potential $V_{BEQ12}$ of $Q_{12}$ is compensated for by a self-biased transistor $Q_{13}$ raising the potential against which the emitter potentials of $Q_1$ and $Q_3$ are referred. $Q_{13}$ is the master transistor in a current mirror amplifier configuration with a slave transistor $Q_{14}$ having, like $Q_{12}$, collector current versus emitter-to-base voltage characteristics in s/r ratio with those of $Q_{13}$. The ratio s/r is chosen large enough that the collector current demand of $Q_{14}$ is several times larger than the base current demand of $Q_2$. The collector current demand of $Q_{14}$ is supplied by connection of the collector electrode of $Q_{14}$ to the emitter electrode of $Q_{12}$, forward biasing the base-emitter junction of $Q_{12}$ to a value $V_{BEQ13}$ substantially equal to the emitter-to-base potential $V_{BEQ}$ of $Q_{13}$.

One skilled in the art of electronic circuit design will be enabled by the foregoing disclosure to design many variations of the circuits (e.g., replacing simple transistors by compound device structures), and the scope of the ensuing claims should be construed accordingly.

What is claimed is:

1. A temperature-sensitive control circuit comprising:
   first and second transistors arranged to sense substantially the same temperature, each having base and emitter and collector electrodes;
   a first source of current connected to the collector of said first transistor for supplying a first prescribed level of current of a polarity as may be conducted as collector current by said first transistor;
   direct coupled collector-to-base feedback means provided said first transistor to apply an emitter-to-base potential thereto for conditioning said first transistor to conduct as collector current said first prescribed level of current from said first source of current;
   means for scaling up the emitter-to-base potential of said first transistor in fixed proportion—i.e., for multiplying it by a constant greater than unity;
   means for applying the scaled up, or multiplied, potential as the emitter-to-base potential of said second transistor; and
   an output terminal to which the collector electrode of said second transistor connects.

2. A temperature-sensitive control circuit as set forth in claim 1 including:
   a second source of current connected to the collector of said second transistor for supplying a second prescribed level of current of a polarity as may be conducted as collector current by said second transistor, whereby an output current is made available from said output terminal which changes polarity at a particular temperature.

3. A temperature-sensitive control circuit as set forth in claim 2 wherein said first and second transistors are of the same conductivity type, and wherein said first and second sources of current together comprise:
 a current mirror amplifier with an input connection, with an output connection to said output terminal, and with a common terminal,
 a resistance connecting the input connection of said current mirror amplifier to the collector electrode of said first transistor; and
 means for applying an operating potential between the common terminal of said current mirror amplifier and an interconnection of the emitter electrodes of said first and second transistors.

4. A temperature-sensitive control circuit as set forth in claim 1 wherein said first and second transistors are of the same conductivity type, and further comprising:
 a source of operating potential having a first terminal connected to an interconnection between the emitter electrodes of said first and second transistors and having a second terminal;
 first and second resistances having respective first ends connected to the second terminal of said source of operating potential and having respective second ends to which the collector electrodes of said first and said second transistors respectively connect, said first resistance corresponding to said first source of current; and
 means for sensing whether the potential drop across said second resistance does or does not exceed the potential drop across said first resistance.

5. A temperature-sensitive control circuit as set forth in claim 1 wherein said first and second transistors are of the same conductivity type as a third transistor and wherein said direct-coupled collector-to-base feedback means, said means for scaling up the emitter-to-base potential of said first transistor in fixed proportion and said means for applying the scaled up, or multiplied, potential together include:
 means connected to the collector of said third transistor for arranging it to operate as an emitter follower;
 direct coupling between the collector of said first transistor and the base electrode of said third transistor;
 galvanic connections of the base and emitter electrodes of said second transistor to the emitter electrodes of said third and first transistors, respectively;
 a first resistance connected between the base electrodes of said first and second transistors; and
 a second resistance connected between the base and emitter electrodes of said first transistor.

6. A temperature-sensitive control circuit as set forth in claim 1 arranged for controlling a heater within a monolithic integrated circuit structure, wherein means are provided for applying an operating potential between the emitter electrode of said second transistor and said output terminal, thereby conditioning said second transistor for operation as said heater.

7. A temperature-sensitive control circuit as recited in claim 1 further comprising means for applying a substantially constant potential across the collector-emitter path of said second transistor.

* * * * *